United States Patent [19]
Othmer

[11] 3,928,145
[45] Dec. 23, 1975

[54] PROCESS FOR PRODUCING POWER, FRESH WATER, AND FOOD FROM THE SEA AND SUN

[76] Inventor: Donald F. Othmer, 333 Jay St., Brooklyn, N.Y. 11201

[22] Filed: Sept. 16, 1974

[21] Appl. No.: 506,237

[52] U.S. Cl. ...... 203/11; 203/DIG. 20; 203/DIG. 1; 159/1 G; 159/1 S; 47/1.4; 60/641; 60/690; 119/3
[51] Int. Cl.².... B01D 3/00; F03G 7/02; A01G 7/00
[58] Field of Search.............. 210/152; 203/DIG 1, 203/DIG. 17, 234; 159/1 S, 24 A, 1 G; 119/2, 3, 4; 47/1.4; 60/641, 690, 691, 692

[56] References Cited
UNITED STATES PATENTS

| | | | |
|---|---|---|---|
| 2,006,985 | 7/1935 | Claude et al. | 203/DIG. 17 |
| 2,636,129 | 4/1953 | Agnew | 159/1 S X |
| 2,854,792 | 10/1958 | Juda | 159/1 S |
| 3,195,271 | 7/1965 | Golueke et al. | 47/1.4 |
| 3,214,351 | 10/1965 | Lichtenstein et al. | 202/185 |
| 3,288,686 | 11/1966 | Othmer | 203/11 |
| 3,344,584 | 10/1967 | Kehoe et al. | 55/46 |
| 3,347,753 | 10/1967 | Morse | 159/1 G |
| 3,362,104 | 1/1968 | Oswald et al. | 47/1.4 |
| 3,661,119 | 5/1972 | Sanders | 119/2 |
| 3,661,262 | 5/1972 | Sanders | 210/169 |

OTHER PUBLICATIONS
A,B,G Show Solar & Geothermal Heat Utilization to Supply Power, C,D,I,J & K Show Mariculture Systems. E is an Example of Controlled Flash Evaporation. F Shows Vapor Reheat & Direct Vapor Condensation. H Shows the Ingestor Principle.

*Primary Examiner*—Jack Sofer

[57] ABSTRACT

Solar energy absorbed in surface waters of tropic and sub-tropic seas may be increased by more heat which can be added by intensive solar heaters. The warm sea water, when flash evaporated, gives vapors which may be passed through a heat engine to give power, then condensed at a lower pressure to give fresh water. Heat of condensation is removed by circulating sea water from a depth, often of only a few thousand feet. This is cold, and has considerable nutrients coming from the degradation of sea life. These nutrients are used in known mariculture systems to grow commercial food fish. Various arrangements of flows of the several liquid streams give different variations to produce power and/or fresh water in addition to food fish. These modifications may be optimized with various systems, some of which are well known, but novel in this usage, including the use of a second thermodynamic fluid, conventional multistage flash evaporation, also two of its variation: - controlled flash evaporation and vapor reheat.

24 Claims, 10 Drawing Figures

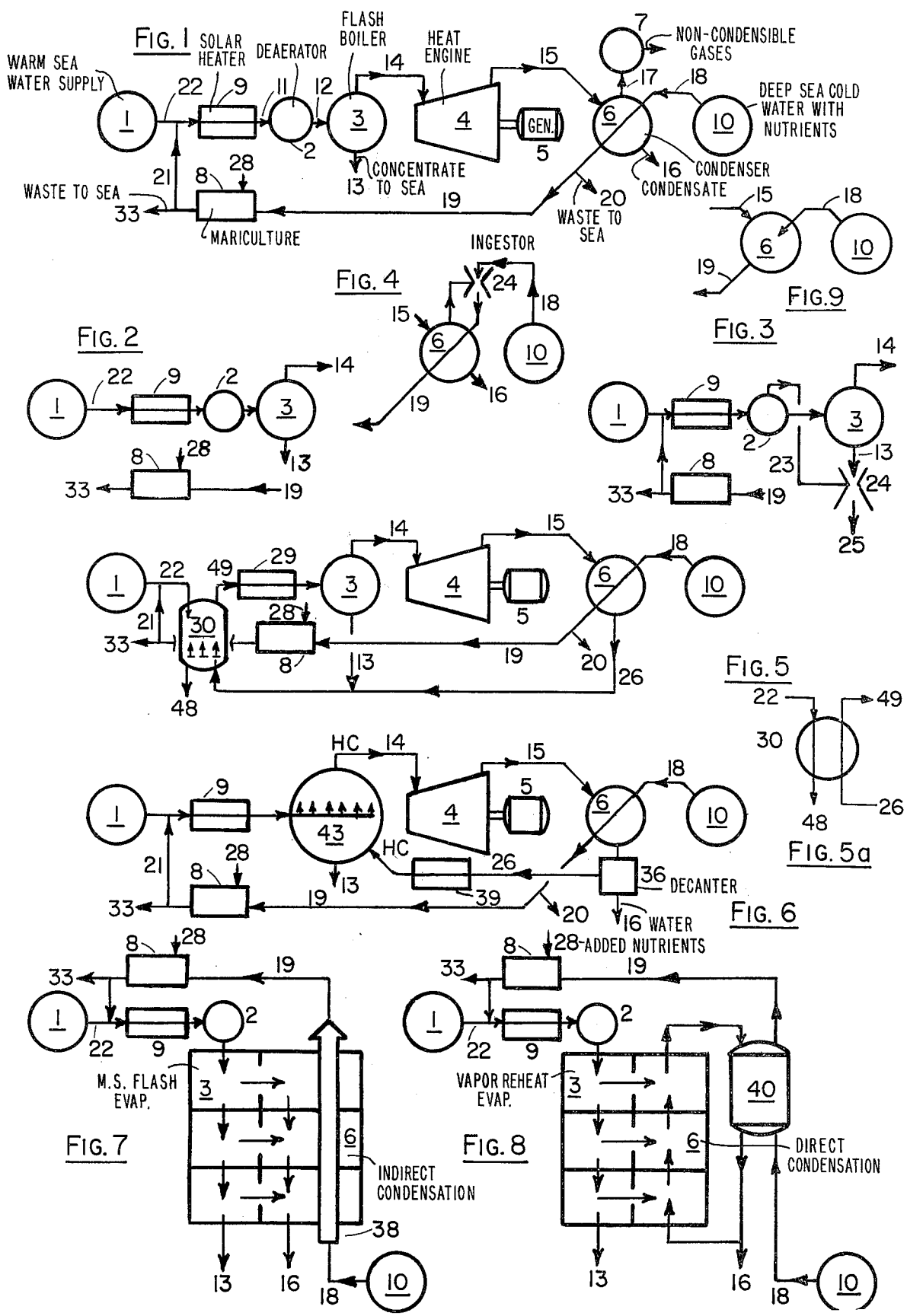

PROCESS FOR PRODUCING POWER, FRESH WATER, AND FOOD FROM THE SEA AND SUN

Warm surface water from tropic seas, either alone or as makeup of a larger cycling stream, may be heated further by a solar heater which is an intensive absorber for solar radiation, then passed to a flash evaporator or boiler at subatmospheric pressure. Some sensible heat of the water leaves as vaporous heat, and the steam formed, as the sea water cools, expands to a lower pressure in a turbine or other steam engine which drives an electric generator or alternator, then passes to a condenser which gives fresh water condensate. Heat is removed in the condenser by cold water which is pumped up from the deep sea. This cold water contains large amounts of nutrients resulting from former sea life. After being heated in the condenser, it is passed to a mariculture operation (as one example, a food chain of algae, shellfish, crustacea, and special sea weeds), thence to the solar heater, and finally to the flash boiler to complete the cycle. Discharge water from the flash boiler may return to the sea, pollution-free and without nutrients. Several novel features of this invention make profitable the long suggested production of power from the difference between the sea's surface temperature and that several thousand feet below; and they include the use of the Controlled Flash Evaporation system, the production of fresh water, the production of very valuable sea plants and animals as products of mariculture, the use of solar heaters to add further heat to the warm sea water, the use of a second thermodynamic fluid, the use of an ingestor - a special type of aspirator for deaerating the warm feed water and the condenser. These other features of the invention, taken in combination with novel arrangements of the flow of process streams, make possible the optimization of the sum-total of the revenue from the several products obtained. Several of these components, which, in combination, make up this invention, are known in the art, and by themselves are not novel, e.g., Controlled Flash Evaporation, Vapor Reheat Evaporation, the Ingestor, Mariculture, Solar Heaters for heating liquid streams up to their boiling points, etc. However, their use in combination in this invention does produce quite new and unexpected results.

THE OCEAN AS AN ABSORBER AND CONVERTER OF SOLAR ENERGY

With over 70 percent of the earth's area, the oceans receive most of the sun's radiation to the earth. This radiation is absorbed in the great area of the oceans and stored in: - (a) the marine life, all of which stems from photosynthesis, (b) the remains of this life - as organic and inorganic nutrients, and (c) vast amounts of heat shown by the warm temperatures of the surface waters of the tropic seas. The first, fish and other marine life, has always been prized; but the last two, heat to supply usable energy, and nutrients for food chains from single cells through all edible plants and animals up to man, are very great resources of equal value which man has never used. In the utilization of the heat, a third basic product, fresh water, may be produced; often it is very valuable because it is where needed the most.

Sea water is always cold in the deeps, and may approach the temperature of its maximum density, near the freezing point. It is cooled in the Arctic and Antarctic Oceans, where it settles to the depths and, by a grand thermo-syphon system, moves on the bottom towards the tropics, where it rises to the surface, is warmed, and moves again in tremendous currents towards the Poles, to recycle. Photosynthesis in the upper layer penetrated by the sun, produces single-cell organisms, thence bigger marine growths, and, by steps, up to the earth's largest plants and animals. The surface waters of the tropics, as a great collector of solar heat, may be crystal clear because photosynthesis has utilized all nutrients. Larger marine life has consumed all the small organisms which cause haze, and thus have stripped the water of carbon, nitrogen, and phosphorus, the principal nutrients of life.

But this life, largely in surface water, dies, as does that in deeper water; and the remains settle to the ocean depths. Slowly these remains disintegrate; and in solution and as particles, residues as chemical materials for new life are carried in the deep currents back to particular areas of upwelling-only about 0.1 percent of the total area of the oceans. Here the great amount of nutrients released where they can be reached by sunlight causes an explosion of marine life. Just one major upwelling, of the Humboldt Current off Peru, supplies one-fifth of the world's total fish harvest.

This heat in the tropic seas and these nutrients coming from the cold waters, are of great potential value; and if they could be utilized, they could supply all the energy which the world can use, as well as much of its protein food.

Very large amounts of cold, deep sea water may be brought to the surface on a tropic shore, warmed in receiving the heat discharged by a suitable utilization of the heat in the surface waters by its conversion from the sensible heat of the liquid through a vaporization process, and passed to shallow ponds wherein the nutrients are used in the photo- and biosynthesis of marine plant and animal food chains. The ultimate product is not a less than pleasant fish meal or an artificial food substance, but, as one example, choice shellfish and other fish. The water may be warmed in the ponds to a temperature higher than surface sea water; and may be passed directly, or after being heated further in a high intensity absorber of solar heat to the high temperature side of a power cycle. The simplest is direct production of very low pressure steam, turbo-generation of electricity, and condensation of the steam in warming the cold, deep sea water, giving fresh water as condensate.

PROXIMITY OF COLD AND WARM SEA WATER

In many places in the world, in both north and south latitudes below 35° to 40°, water near the bottom of the sea when this is over about 2500 feet deep, may be from 25° to 45°F colder than surface water. There is little conduction of heat, top to bottom, and little mixing because of density differences, except in notable upwellings.

This temperature difference between surface and deep waters is small, considering those between fluid streams passing to and from conventional thermal energy cycles. However, the available heat is the product of this temperature difference multiplied by the available masses of sea water; and these are infinite for all practical purposes. Means for the conversion of this available heat to electrical energy could give very much more than mankind has the capability to use.

For example, the Gulf Stream carries the heat absorbed in the Caribbean and the Gulf of Mexico, north past the coast of Florida. Over 20 cubic miles of water per hour may be as much as 45°F warmer than the cold, deep water which it was, and as much warmer than other comparable volumes flowing very near by. To heat just 1 cubic mile of sea water per day by 45°F would take much more than all of the electrical energy produced in the United States. In reverse, if this heat in the Gulf Stream were discharged to water, colder by 45°F, it could generate continuously more than 75 times the entire electric power used in the United States, which may indeed be much more than the consumption of the entire world.

Many places within a few miles of land have sea water with a surface temperature of 75°F to 85°F, while at 2500 to 3500 feet, or more, below the surface, near the ocean's floor, the temperature may be 40° to 45°F. The ocean floor may drop off from the shore line very steeply within a few thousand feet of land.

THERMAL POWER FROM LOW TEMPERATURE DIFFERENCES

Mechanical energy, thence electrical energy, can be developed by passing the heat in any body at any temperature to any other body which can receive it, because of its lower temperature. Theoretically, the maximum efficiency of the conversion of heat to power is $(T_1-T_2)/T_1$ where $T_1$ is the temperature of the hot body and $T_2$ is the temperature of the cold body. These temperatures are measured above absolute zero, i.e., in degrees Rankine- where °F+460=°R. For efficient heat engines, this temperature difference may be hundreds or even thousands of degrees. The closer the temperature of the heat input approaches that of the output, i.e., the smaller the difference, the less the efficiency.

In this invention, the warm body is surface water and, as an example, sea water is assumed to be at about 86°F. It is cooled by flash evaporation at a lower pressure to about 77°F, wherein sensible liquid heat becomes vaporous heat. Very low pressure steam is produced at this same temperature, about 77°F. This steam expands and does work in a turbine and then is condensed at 59°F by the deep sea cold water which is heated thereby from 41° to 50°F. There is a 9°F loss in the condenser tubes of this valuable temperature difference; thus this temperature of 59°F may be regarded as the low temperature at which the available heat is discharged.

This is another example of the transfer of heat from the sensible heat of a liquid - here water has about 1 BTU per pound - to the latent heat - here water has over 1000 BTU per pound.

Hence, if the steam production is at 77°F or 460° + 77° = 537°R above absolute zero, and the corresponding temperature at which the heat is rejected (steam condensation) is 59°F or 460° + 59° = 519°R, then the maximum thermodynamic efficiency of power generation is (537° − 519°)/537° or about 3.3 percent.

It is noted in this example that the difference of the temperatures of the available warm and cold water is 86° − 41° = 45°; however, the effective operating temperature difference is only 77° − 59° = 18° or about 40 percent as much. About one-fifth of the gross temperature drop is taken in this example as being utilized in cooling the warm stream (9°) and in warming the cold stream (9°); and another 9° is utilized as the driving force in the heat exchanger.

While the warm sea water may be at 86°F, the water leaving the mariculture pools, mentioned above as an important one of the several elements which, in combination, make up this invention, may be even higher, 95°F. However, so high a temperature usually is not advantageous to the mariculture operation; and the average temperature in a pond with continuous flow would, of course, be lower. Furthermore, by flowing through ponds with black bottoms and transparent covers, the temperature of the sea water may be increased to 175°F. Several other and more efficient systems for absorbing solar radiation are well known; and their particular design is not a part of this invention, although they may be well used in combination with other features, since they do allow a much higher temperature to be reached. Closed tubular systems as solar heaters under pressure are also well known in the art; but if atmospheric pressure is not to be exceeded, the maximum temperature available may be set at about 212°F.

The following table indicates the maximum thermodynamic efficiency which is theoretically obtainable under each of these several temperatures reached due to solar heat input in different ways. In each case, the same amount of cold deep sea water is used at 41°F as of warm surface water; and there is assumed to be a 9°F loss in the heat exchanger and an equal sum-total amount of the available temperature drop, on both the heating and the cooling sides, as that between the steam temperature on the inlet and the steam temperature on the outlet of the turbine. In other words, one-half of the gross temperature drop after the 9° loss in the condenser, is assumed to be in power generation and one-quarter is assumed to be in flash cooling the warm water and one-quarter in heating the cold water. The calculations are simplified very considerably; and the results will vary in practice; but they indicate in general the relation of some of the parameters involved.

TABLE I

Maximum Thermodynamic Efficiencies of a Thermal Power System Utilizing a Flash Boiler Fed with Sea Water of Different Temperatures, a Steam Turbine, and a Condenser Operating with 41°F Cold Sea Water. Pressure, Elevation of Boiling Point and Hydraulic Losses Neglected. (All Temperatures in °F).

| Warm Water Source | Warm Water Temp. | Gross $T_1$-$T_2$ | $(T_1$-$T_2)$ minus 9° | ΔT to Power $(T_1$-$T_2)$-9° / 2 | ΔT to Warm and to Cold Water | High Temp. Steam | Max. Carnot Eff.% |
|---|---|---|---|---|---|---|---|
| Surface Sea Water | 86° | 45° | 36° | 18° | 9° | 77° | 3.3 |
| Mariculture Ponds | 95° | 54° | 45° | 22½° | 11° | 84° | 4.1 |
| Solar Heater (Pond) | 175° | 134° | 125 | 62½° | 31° | 144° | 10.0 |
| Solar Heater | | | | | | | |

TABLE I-continued

Maximum Thermodynamic Efficiencies of a Thermal
Power System Utilizing a Flash Boiler Fed with
Sea Water of Different Temperatures, a Steam
Turbine, and a Condenser Operating with 41°F Cold
Sea Water. Pressure, Elevation of Boiling Point and
Hydraulic Losses Neglected. (All Temperatures in °F).

| Warm Water Source | Warm Water Temp. | Gross $T_1-T_2$ | $(T_1-T_2)$ minus 9° | ΔT to Power $\frac{(T_1-T_2)-9°}{2}$ | ΔT to Warm and to Cold Water | High Temp. Steam | Max. Carnot Eff.% |
|---|---|---|---|---|---|---|---|
| (Tube) | 212° | 171° | 162° | 81° | 40° | 171° | 12.8 |

It is possible to vary greatly the distribution of the relative amounts of the available temperature drop between the power generation and the production of fresh water. Also, vapors from the flash boiler may by-pass the turbine and go directly to a condenser; and there will be no power generation. In that case, there would be used a multiple flash evaporator (MSF), preferably of the controlled flash evaporation (CFE) type.

It is possible to vary greatly the relative amounts of warm water and of cold water which may be passed to the system; and the relative temperature changes of the two streams vary inversely as these amounts. In Table I, it is assumed that the amounts of the two streams of sea water are equal, and this gives the minimum total amount of the available temperature difference for cooling and for heating these respective two streams.

In Table I, the maximum Carnot or thermodynamic efficiency is indicated in the last column. It may be two, three, or more times any efficiency which is attainable in practice in the overall power generation, because of the neglect in this theoretical calculation of many thermal, hydraulic, mechanical, and electrical losses; also because of many energy requirements in accessory machines and the many losses of these machines. However, the last column does show very well the relatively great advantage of a higher temperature of the inlet water, and the desirability of going to some effort and expense to supply a stream of water at as high a temperature as possible. Of equal importance usually, the amount and cost of the power plant equipment required for a given output always decreases greatly with an increase of the temperature difference which is available between the warm and cold water. However, the cost of the solar heater for giving this temperature increment may be the deciding factor in such an optimization of design.

OBJECTS OF THE INVENTION

Among the objects and accomplishments of the invention are:

1. The production of a larger amount than hitherto possible of thermal power utilizing warm and cold water as drawn directly from the sea.
2. The simultaneous production of distilled or fresh water.
3. The utilization of the nutrients in the large amount of cold water brought up from the deep sea for mariculture of selected marine plants and animals.
4. The use of heat transfer equipment having minimum losses in temperature differentials between the fluid streams receiving and giving up heat.
5. In novel combination, the use of various known operations in different ways to secure the maximum revenue from the production and sale of power, fresh water, and food using as available sources surface and deep sea waters and solar radiation under tropic and sub-tropic conditions.

ELEMENTS OF PROCESS

Among the novel features or improvements which are the elements of the present process and are to be considered taken in combination for the production of power and for fresh water and food from the thermal differences of sea water (but not necessarily all to be incorporated in any one installation) are:

1. The production of a substantial amount of fresh water by condensation of vapors leaving a steam turbine following flash evaporation of some of the warm water.
2. The use of the deep sea water after it has been warmed in the condenser for the vapors from the flash boiler and the turbine for a mariculture operation and with or without the addition of additional nutrients.
3. The use of Controlled Flash Evaporation (CFE) as a means of flash boiling of a part of the warm sea water to minimize the substantial loss of temperature drop between boiling liquid and steam always present in the conventional flash boiler.
4. The use of an ingestor for vacuum purging of permanent gases from: -
   a. the condenser by redissolving or "ingesting" the discharged non-condensible gases into the feed of cold, deep sea water, and/or
   b. the warm water supplied to the flash evaporator, either by use of the discharge stream of sea water from the flash boiler, or by the use of the deep sea water after it has passed through the condenser.
5. The use of two or more stages of Vapor Reheat Evaporation for utilizing the heat in the warm sea water and the production of the maximum amount of fresh water distillate, without producing power.
6. The use of a high intensity absorber for solar energy as a solar heater to increase further the temperature of the warm surface sea water and/or the temperature of the water from a mariculture operation before being passed to the flash boiler.
7. The use of plastic tubes in the condenser or in the heat exchangers, if a circulating stream of fresh water is chilled, and used in a cycle for condensation.
8. The use of a separate thermodynamic fluid, e.g., a hydrocarbon of from four to six carbon atoms, ammonia, or other liquid or mixture of liquids boiling between about −29°F to 145°F in a closed system of the boiler, turbine and condenser with either direct contact or surface heat interchange between the sea water streams and the hydrocarbon streams in the flash boiler, and/or the condenser.
9. The use of a direct contact liquid-liquid heat exchanger, sometimes called LLEX, to remove heat from one warm stream of liquid, and passing it to another, colder stream.

These several operations, most of which are well known and used individually, and others, have been combined in several different flow sheets of individual steps and stream flows. Each of these novel flow sheets, by taking several of the known component elements in combination with each other, secure new and unexpected benefits - usually increased efficiencies in the operation - so as to increase the sum-total of the value of the several commercial products which may be sold, or to decrease the sum-total of their several costs.

FIGURES

The figures are entirely diagramatic flow sheets with no scale as to size or arrangement of vessels, piping and other parts and are primarily to indicate the flow of fluids involved in the several operations which, taken in various novel combinations, comprise the invention. Pumps, tanks, controls, shut-off and operating valves, are not shown.

FIG. 1 is a generalized flow sheet wherein there is surface water influent and effluent, to and from a flash boiler, and deep, cold water influent and effluent, to and from a condenser and mariculture ponds in series.

FIG. 2 is a partial flow sheet of one arrangement of water supply to the flash boiler where there is surface water influent only as makeup via solar heater to flash boiler; and deep water influent, which, after passing through the mariculture ponds, discharges to the sea.

FIG. 3 is a partial flow sheet of the use of an ingestor for deaeration of the surface water feed to the flash boiler.

FIG. 4 is a partial flow sheet of the use of an ingestor as the vacuum pump for the surface condenser.

FIG. 5 is a flow sheet wherein a second liquid in a closed cycle is used as the thermodynamic fluid.

FIG. 5a is a partial flow sheet showing a diagram of an alternative heat exchanger for warming indirectly the cold condensate of the second thermodynamic liquid with the warm influent sea water.

FIG. 6 is a flow sheet wherein the second liquid boils while in direct contact with warm water in which it is insoluble.

FIG. 7 is a flow sheet wherein no power is generated, and a conventional system of multistage flash evaporation is used to produce fresh water condensate.

FIG. 8 is a flow sheet wherein no power is generated and a Vapor Reheat system of multistage flash evaporation is used to produce fresh water condensate.

FIG. 9 is a partial flow sheet showing a diagram of an alternative condenser wherein the vapors from the flash evaporation are condensed by cold deep sea water in open dispersed flow of films, sprays of drops, or otherwise.

THE BASIC POWER CYCLE

The heat available in warm surface water, and at the low temperature difference it has above the available cold water to which it can be rejected, can be converted to power only with a plant which is large and costly and performs at a very low efficiency compared to a conventional thermal-electric plant. It requires the handling of very large amounts of cold, deep sea water to absorb the heat. For best use of the temperature difference between the cold and the warm sea water, the amount of each used should be the same. However, some other considerations may require a different amount of warm water supplied to the flash boiler than of cold water supplied to the condenser. Large as these quantities of water are, the sum-total of the water circulated may be less than the amount of water required to produce the same amount of power in a hydroelectric plant. Also it must be considered that dams, penstocks, and the machinery of a hydroelectric plant are also large and expensive in developing a "free kilowatt"; that is, free of the cost of energy.

The cold water does not have to be raised from the great depth; only the friction head of the pipe carrying it must be considered, plus the small static head caused by the difference in density of the cold water and the average density of the water from the surface to the bottom of the suction pipe.

The simplest of many possible power systems is that of Claude, who flash boiled in an evacuated chamber a small amount of the warm surface water as it cooled. He obtained a maximum of 1 percent of the water as a very low pressure steam, which expanded to turn a turbine rotor in cooling further, and finally was condensed to give up its heat to the low temperature water pumped up from the deeps. "Open" condensation of the steam from the turbine by sprays of the cold sea water may be used, but the fresh water is then lost in the cooling stream of sea water. This has the advantage of considerable reduction in the cost of the plant. More often steam is condensed on tubes through which the cold water from the deep is passed as it is being warmed. The steam may also be condensed in a third manner by circulating chilled fresh water sprays as in another embodiment of the present invention; and the condensate is obtained, the same as if condensed on tubes, as fresh (distilled) water, almost always a valuable commodity on tropical coasts; and its sale adds to and may even exceed the revenue from the power produced.

Because of the very low temperature and pressure of the turbine exhaust steam, the turbine must be specially designed; and the condenser, particularly if of tubular design, is large.

The surface water used has been warmed by the ocean's absorption of solar energy. However, more intensive collectors of solar energy are available are open ponds with black bottoms or special tubular devices. While temperatures above the boiling point may be reached, the solar heater may be less expensive and its operation more efficient if the warm sea water is heated as high as practical, but below its boiling point.

CONTROLLED FLASH EVAPORATION (CFE)

The CFE system has been described as a means which provides boiling or evaporation under near equilibrium conditions between the water and the steam so that there is practically no loss of available temperature drop between the two streams of warm water and of low pressure steam leaving the flash chamber or boiler, as described in Mechanical Engineering, May 1971, p. 27, also in Kirk-Othmer, Encyclopedia of Chemical Technology, Second Edition, vol. 22, pp. 32–38 and Pat. No. 3,214,350. Because the temperature drop which is available for the boiling itself controls the efficiency of the process, this CFE system is ideal for, although not essential to, the operation of this invention. In the boiling chambers used in conventional multistage flash units, the maximum range of flashing which can be used without extreme losses is much less than would have to be attained by the single stage flash boiler of this invention, while the CFE performs well under the large temperature range of the flash boiling of this operation.

SOLAR HEATER

As noted above, the maximum thermodynamic efficiency of any heat engine, of which the present one is a very inefficient example, depends on the difference between the high and the low temperatures which are available. In the continuous operation under the tropic sun of mariculture ponds only 3–4 feet deep, the effluent water temperature will usually be higher than that of sea water drawn from its surface, although the temperature of the inlet water to the mariculture may be lower. These temperatures are controlled desirably to maximize the mariculture production of its particular animal and plant life.

Many methods of solar heating of water have been developed and their particular details are outside the scope of this invention. They may depend on dissolution of suitable dyes in the water in open ponds, better to absorb solar radiation, on using special absorptive black bottoms of ponds, on covering the water's surface with charcoal, graphite, or other black pigment, on passing the water through tubes or other channels made of special radiation absorptive material or surface, on developing ponds of special gradients of salt concentration, and on systems which depend on still other physical or optical properties, or on mechanical design of special equipment.

The methods and systems of such means of increasing the absorption of solar energy are not the subject of the present invention; but they may be the basis of some device which will merely be called a "solar heater" for heating the surface sea water or the water discharged from the mariculture ponds to a temperature higher than obtained in conventional surface water. Such a high thermal absorption device or step, taken in combination with the other features of this process, does allow marked improvement in the efficiency of the operations. The term "solar heater" here denotes an additional unit, as distinguished from the wide expanse of the sea itself, which provides the tremendous absorption area for the heat in the surface water.

MARICULTURE

Heat from warm surface water produces power and fresh water as it is passed to heat the cold deep sea water up to a temperature much more favorable for biologic growth, i.e., between 55° and 95°F. The deep water is rich in nutrients, principally nitrogen and phosphorous, also other elements for the growth of marine life. These elements may be quite exhausted by the high rate of photosynthesis in the sparkling clear surface tropic waters. Of equal importance, the deep water is practically free of: -organisms which produce disease in humans, predators and parasites of shellfish, fouling organisms, and man-made pollutants. Shellfish culture using surface waters has had major disasters from pollution in the past years along the continental Atlantic coast and elsewhere.

Various plant and animal species are known which will give a food chain having a substantial commercial value of the product species at the top with a minimum cost in production. One example will be given of a food chain of species. This chain starts with unicellular plants; and two types of diatoms (algae) have been particularly satifactory in again utilizing the sun's radiation, this time in photosynthesis. After innoculation of the warmed deep sea water, it develops up to 1 million diatoms per milliliter. Early work showed that water from a depth of 2500 feet gave 27 times the growth of algae compared to the production obtained from surface water; and peak yields of 1900 pounds algae per 1 million U.S. gallons deep sea water have been obtained. In some cases, it may be desirable to add additional nutrients in the form of compounds of nitrogen, phosphorous, and other elements necessary for growth of the algae as a synthetic fertilizer; but usually this deep water has adequate nutrients.

Clams and oysters are typical shellfish which feed on algae by filtering them from the water they continually process.

At least a 60 percent conversion of algae to commercial foods was found to be possible; and on an overall material balance, these nutrients, mainly nitrogen and phosphorous, do give 27 pounds of fresh clam meat per million U.S. gallons of deep sea water.

Specially developed strains of the European oyster, and the bay scallop, have been grown from spat to market size in 6 months. This is considerably faster than in nature. Other oysters grow from ⅛ inch to market size in a little more than 8 months; and one species has grown from an average live weight of 1 gram when introduced to 70 grams in 74 days.

Large numbers of small clams at different ages are culled by screening to minimize their competition with the faster growing ones; and the culls are very acceptable food for crustaceans. Adult spiny lobsters showed an average weight gain (in an 89 day period between moltings) of up to 55 percent while eating 5.2 times as much food weight as their gain in weight. Cold water lobsters from Massachusetts also have been grown at a greatly accelerated rate in the warm waters of subtropic mariculture ponds.

The effluent waters from shellfish and lobster operations carry dissolved animal wastes which might be a pollutant. However, specialized seaweeds grow extremely fast in this effluent water and, on processing, they give agar and carageen which have worthwhile markets.

The biology of mariculture per se is known in the art; and it and the particular food chain of animals grown is not a part of this invention. However, overall and in combination with other features, mariculture may advantageously be combined in new and novel ways to be a part of the larger processing system of this invention, involving also power production, and/or fresh water production. The handling and heating of the deep sea water represents mechanical and thermal factors of a sufficient magnitude to warrant the incorporation therewith of the other and thermodynamic factors. The optimum temperature for the mariculture must depend on the animals and plants being cultivated, and the combination of the other features of the invention allows the optimum temperature for any mariculture system to be obtained. Also the temperature of the water in mariculture ponds which are operated continuously increases during the necessary residence time of some days therein. In general, the temperature may be between 55° and 100°F; and the highest temperature may be in the final seaweed growth, when the water is practically exhausted of nutrient values.

GENERAL PROCESS FLOW SHEET

Warm surface water entering from 1, and/or deep sea water cycled from the mariculture entering through pipe 21, pass through line 22 to the high intensity solar heater 9, thence through pipe 11 to a deaerator 2, thence to the flash boiler 3. Most of the water is discharged, somewhat cooler, by line 13 back to the sea; but a small amount of the sea water boils off as steam which passes through line 14 to the turbine 4 which drives an electric generator or alternator 5. Exhaust steam from 4 passes through pipe 15 to the surface condenser 6. This may have conventional metal tubes in a standard construction or be designed for and fitted with thin plastic tubes, which greatly reduces the overall cost of the plant. Fresh water condensate discharges through pipe 16; and non-condensible gases go by line 17 to air removal 7 by vacuum pump or otherwise. The deep sea water from 10 passes through pipe 18 to be heated in 6 and to be discharged, possibly in small part, back to the sea by line 20, but mainly through pipe 19 to the mariculture system 8. Here the nutrients of the deep sea water are completely consumed by algae as the first link of a food chain, and additional nutrients may be added through line 28; usually none are necessary. Effluent from the mariculture 8 may be discharged back to the sea through line 33, or it may go through pipe 21 to the solar heater 9. If a solar heater 9 is not used, a by-pass line, not shown, would take its place. If the solar heater 9 is used, the water from 8 is heated to a substantially higher temperature, but usually not above the atmospheric boiling point. It then may pass by line 11 to the deaerator 2, or if it is above about 170°F it may go directly to the boiler 3.

The heater 9 or even the continuous mariculture ponds 8 may discharge at a temperature higher than the temperature of the surface sea water, although optimum plant and animal growth is usually at a lower average temperature. Thus, there may be no need for inflow from 1, depending on the thermal balance or this flow from 1 may be controlled as only a slight amount to "trim" this balance.

It may be desired to use only deep sea water via 8 and 9, thus to eliminate entirely the surface water feed from 1, with consequent saving of the necessary inlet pipes, pumps, trash racks, etc. With no surface water, there is only one stream of sea water inflow - of the deep water from 10, most of which ultimately discharges at 13 and some as distillate at 16.

An alternative processing in this basic flow sheet is shown in FIG. 9 wherein there is used a condenser 6 with an open instead of a closed flow of cold deep sea water. Steam then is condensed in 6 by direct contact with sprays or films of cold water from the deep. Non-condensible gases are handled by the air removal system 7, an ingestor, or a vacuum pump. This direct condensation is used where there is no demand for the fresh water condensate - which would, in this case, be part of the deep water stream going to the mariculture, would dilute it with distilled water by an amount of only 1 percent, and offers no disadvantage.

HEATING OF SURFACE WATER

FIG. 2 shows the operation where a substantial amount, or even all, of the water fed to the flash boiler 3 may come from surface sea water supply 1, by way of line 22, to the solar heater 9, then through line 11 to the deaerator 2. In this variation of the process, which would be used if the surface water is warmer than that discharging from the mariculture ponds, as it may well be, for those mariculture operations which may have an optimum temperature of between 75° and 80°C, the discharge from the mariculture would go directly back to the sea by line 33. The balance of the flow sheet would be as in FIG. 1.

DEAERATION - THE INGESTOR

The removal of dissolved gases, in this case air, from the sea water feed and also non-condensible gases leaving the condenser represents major problems in any evaporation of sea water, but particularly so in this case because of the very large volume of liquid which must be handled on a once-through basis since only such a small amount is actually evaporated. One system, which is particularly useful here, is the so-called "ingestor" described in U.S. Pat. No. 3,344,584. It may be used either as a water-activated ejector or aspirator for the permanent gases, thus as a deaerator of the warm water feed, or as the vacuum pump in removing non-condensible gases from the condenser, or as both. Substantially this operation depends on utilizing the large flow of the respective water streams in dissolving or "ingesting" the non-condensible gases; and these gases will go into solution in the large flow of water, or some amount may pass off as bubbles in the water discharged.

FIG. 3 is a part of the overall flow sheet and it shows the use of an ingestor 24, in effect acting as an aspirator, for deareating the feed of the flash boiler surface water directly from 1 or from the mariculture 8, or from the solar heater 9, as described in U.S. Pat. No. 3,344,584. The warm water to be deaerated passes through a chamber of lower pressure 12 so that the dissolved air and some vapor go out of solution and pass off through pipe 23, while the deaerated feed passes to the flash boiler 3. The discharge liquid from 3, about 99 percent of the feed to 3, passes to the ingestor 24 by way of 13, where it creates a suction which withdraws the non-condensible gases. These gases redissolve in the large volume of water or some way remain as bubbles in discharging through line 25 with most of the original warm sea water, now cooled somewhat by the flash evaporation in 3. This cooling increases the solubility for gases which went out of solution from about the same volume of warmer water.

If, in the arrangement of the piping for handling the large flows of water, it is convenient to use the deep sea water discharging from the condenser by the pipe 19 as the supply stream of water for operating the ingestor, a more effective operation may be secured with this colder water than with the use of the surface water discharging from the flash boiler.

In those cases where a solar heater is used to supply a higher temperature feed to the flash boiler, the solubility of gases, principally oxygen and nitrogen, decreases markedly in the water with increasing temperature of this warmer water; and at temperatures approaching the boiling point, which are possible with some designs of solar heaters, the main purpose of the deaerator may be to aid small suspended bubbles of air to be disengaged. Only a small amount of the total stream of either the surface or deep sea water then may be required to be used, through 24; or the size of a vacuum pump to deaerate may be so small as to make its use more convenient.

FIG. 4 shows the removal of non-condensible gases from the condenser by an ingestor 24 as in FIG. 3, using the cold deep water entering by pipe 18, ingesting or dissolving non-condensible gases and some vapor and discharging by line 25 through the condenser. Alternatively, a vacuum pump may be used, or if high pressure steam is available a standard steam ejector.

USE OF ANOTHER THERMODYNAMIC FLUID

Water has disadvantages as the thermodynamic fluid in the temperature range which is available; but it has the major advantage of producing fresh water, usually valuable and highly desired. If fresh water is not wanted, a second fluid may be used as the thermodynamic agent, which is flash evaporated to give vapors to produce power; and these then are condensed for recycle. The vapor pressure of the second fluid is many times that of water, and the vapors are much denser. Two advantages accrue: - first, in such a closed system no deaeration of large amounts of water is required, and second, the turbine may be very much smaller because of the higher pressure and greater density of the vapors. A suitable fluid should be cheap and have a boiling range between propane at about −43°F, or ammonia at about −29°F to n-hexane at about 145°F. In between are hydrocarbons, cheap and readily available, the butanes, the pentanes, and the hexanes; and these may be used in a pure form or in any suitable mixture. Also, there are many halogenated hydrocarbons; however, these usually will be too expensive to be considered. While ammonia may be used alone, it also may be used in an aqueous solution, which will evaporate to give vapors of a fixed compositions, as its condensate returns to maintain a fixed composition in the boiler.

FIG. 5 diagrams one system for using a second fluid of lower boiling point and higher vapor pressure. The warm surface water from 1 and/or the water from the mariculture 8 is passed to a counter-current heat exchanger 30. In 30 the warm water preheats the recycling second fluid coming from the flash boiler 3 by line 13 and from the condenser 6 coming by line 26. A solar heater 29 may or may not be used for further heating of the second fluid. A much greater mass of vapors is formed in the flash boiler 3; and in the operating temperature ranges, these vapors are of a much greater density and have a higher pressure then the water of the previous examples. The high latent heat of water means that a smaller weight of water is evaporated for a given amount of heat involved than of any other fluid. Also, except for ammonia, the molecular weight of the second fluid is much higher than that of water, so that vapors of other fluids are denser. Since they are chosen to have much lower boiling points than that of water, their vapor pressures will be higher, usually very much higher than that of water at any given temperature. Thus, the turbine 4 may be very much smaller. Again, the condenser 6 condenses the turbine exhaust; and condensate is recycled through line 26, then 30, and 29 to 3. The deep sea water, warmed in 6, passes to the mariculture 8 on its way to 30. Alternatively, if it is at a lower temperature than the surface water as it may be with some species of fish, it may be discharged back to the sea through line 33.

This system using a second fluid has the disadvantage that it requires the substantial inventory cost of the fluid, although the operating losses may be very small in its recycle in the closed system. The major disadvantage, however, besides the lack of production of fresh water, is that there is a loss of available temperature drop which is occasioned in the heat exchanger 30 in passing of the heat from the warm water to the second fluid to allow it to evaporate as compared to allowing water to evaporate directly. Very low-boiling second fluids of this preferred boiling range have the disadvantage that they build up high pressures at ambient tropic temperatures, e.g., ammonia and propane some 10–15 atmos. Thus provision must be made for drainage and storage of these second fluids at these pressures during any shutdown of the plant.

The heat exchanger 30 may be a conventional tubular unit as shown in FIG. 5a or it may be a liquid-liquid direct contact heat exchanger, when the second liquid, e.g., a hydrocarbon, is quite insoluble in water. This is called LLEX; and it is described in many places, e.g., in U.S. Pat. Nos. 3,250,081, 3,377,814, and 3,288,686. LLEX is especially advantageous here in the transfer of heat from one liquid to another immiscible one. Basically, a counter-current liquid contactor is used, of any one of several types which is also efficient for liquid-liquid extraction. In FIG. 5, warm water from line 22 is fed as droplets, spray, or other open flow into a vertical tank 30 near the top and into a continuous phase of the colder second liquid hydrocarbon which is to be heated. The water droplets settle down through and are cooled, as the hydrocarbon is warmed. A continuous layer of water is formed about the middle of the tank and the cooled water discharges at the bottom through 48. Warm hydrocarbon introduced as droplets or other open flow from the line 26 rises to absorb the heat of the warm sea water, first in the continuous water layer, then in the continuous hydrocarbon layer. Heated hydrocarbon passes off the top through line 49 to the solar heater 29, for further heating, then to the flash boiler 3.

FIG. 6 shows another method of supplying heat by direct contact of the stream of warm water with the second fluid, if it is a hydrocarbon or other liquid insoluble in water. (Obviously this cannot be used with ammonia.) The warm surface water, or water from the solar heater 9, in the form of drops, sprays or other open flow is directly contacted with, e.g., a hydrocarbon which, under the pressure existing in the boiler 43 causes the hydrocarbon to vaporize completely to give vapors to drive the turbine 4 and to be condensed in the condenser 6. Discharge sea water passing out of 43 should be free of hydrocarbon due to its insolubility; and the lower density causes it to float on the surface. The hydrocarbon may be introduced best into the bottom of 43 and passed countercurrently to the sea water flow (as is done in a boiler where it is desired to rectify out a much more volatile material, e.g., the boiler for butane out of sea water described in U.S. Pat. No. 3,250,081). A small amount of water is carried along in the constant boiling mixture with the hydrocarbons or other insoluble liquids used. This may be insignificant and it may be returned with the condensate from 6 by line 26 to the boiler by way of the second solar heater 39, if desired. If the amount of water is significant, as it will be when hexane is used, a decanter 36 traps it out, and it is discharged through 16.

It should be noted, in conjunction with this "steam distillation" effect, as to the vapor pressure in the closed chamber or flash boiler 43, that the effective pressure where the two fluids are in contact at one temperature will be the sum-total of those of sea water and the second fluid, therefore the two liquids, when mixed, must have a higher temperature and pressure in entering the boiler 43 in order to cause the flash distillation at this boiler temperature. Warm water enters the boiler 43 through a sparger, the short arrows of which indicate entrance of drops of water in intimate contact with the boiling mass of insoluble second fluid.

MULTISTAGE FLASH EVAPORATION (MSF)

Under some conditions, the heat in the warm sea water, either with or without added heat from a solar heater, may be more valuable when utilized to produce the maximum amount of fresh water condensate then to make some amount of electric power and a corresponding amount of condensate as described above under the General Process Flow Sheet. It has been found that the mariculture may be an important contributor to revenue in such a program.

The most efficient method of utilizing heat to produce fresh water is by multistage flash evaporation (MSF); and this has been found desirable as a part of the combination of steps of this invention.

Again, it may be assumed, as in other examples considered above, that the MSF evaporation will be accomplished most efficiently but not necessarily by Controlled Flash Evaporation (CFE), a method of operation of the evaporation side of the MSF system of stages. Now, however, there may be several stages or even many, i.e., 10–40 depending on the temperature difference available between the warm and the cold water. Only a few stages will be used if the higher temperature is that of the surface water - a much larger number may be indicated if a solar heater is used to give a high temperature of from 170° to 212°F, or even higher.

FIG. 7 is the flowsheet of the essentials of a MSF system showing the possibilities of using warmed deep sea water, surface water, and/or one or both heated to a higher temperature in a solar heater. The warm sea water enters the evaporating-cooling side 3 of the MSF which may desirably, but not necessarily, be of a CFE design. Successive stages are at successively lower temperatures and pressures; and corresponding amounts of steam are formed and pass, as shown by the horizontal arrows, to the right or condensing-heating side 6 of each stage. The cooled sea water effluent is at 13.

The cold sea water enters through line 18, passes through condenser tubes 38 where it is heated by steam condensing on the outside of the condenser tubes and thence through 19 to the mariculture 8 and the solar heater 9, finally back to the flash evaporator stages 3 and effluent at 13.

VAPOR REHEAT (MSF)

Multistage flash evaporation (MSF) has another modification on the condensation side of the stages, the so-called Vapor Reheat system which may be used in combination with the other features of this invention. This depends on circulating a stream of pre-cooled condensate through the condensing zones of MSF in open flow - sprays, films, jets, etc. The cooled condensate, in dispersed open flow, intimately contacts the steam formed in each stage to condense it; and it is then circulated to each higher temperature stage where it countercurrently condenses each higher pressure stream of vapors. The temperature and the amount of the condensate streams are thus increased stage-by-stage to the highest temperature stage. The condensate is then circulated to a heat interchanger, with the cold deep sea water to be cooled thereby. It is then passed back to be reheated again by the condensation of more vapors in each stage.

The Vapor Reheat System has been described in many publications, e.g., Chemical Engineering Progress, vol. 59, p. 63, Dec. 1963, also U.S. Pat. Nos. 3,288,686, 3,329,583, 3,446,712, and others. When used as part of the combination of the several operations of this invention, the Vapor Reheat flow sheet may be diagrammed in FIG. 8, with 3 stages - presumably CFE - on the left 3 as successive flash evaporators, and 3 stages on the right 6 as successive direct contact condensers with open flows of chilled condensate circulated in counter-current to the flash boilers. Condensate is cooled in a heat exchanger 40 by the cold deep sea water. Additional condensate which is formed in each pass through the condensing stages passes upwardly stage-by-stage and is withdrawn as fresh water at 16. Dissolved air is removed along with other noncondensible gases from the condensation step as shown in FIG. 1 at 7. The mariculture at 8 and the solar heater at 9 allow full advantage to be secured to these features of the invention to be realized in this combination of operations to secure these unexpected results.

Many other descriptions of Vapor Reheat indicate the advantages of using the liquid-liquid heat exchanger (LLEX) as described above to minimize the loss of valuable temperature drop in 40, and here again the LLEX may be used to advantage. So that the heat exchanger 40 may represent not only the conventional type of heat exchanger but also one depending on direct contact of the two liquids. Thus the transfer of heat from the stream of hot condensate entering 40 from 6 is accomplished by contacting the condensate in open, dispersed, and counter-current flow relation to a stream of colder, water-insoluble, liquid; then transferring the heat so gained by said water-insoluble liquid by contacting it directly with the stream of cold, deep sea water entering from 10 in open, dispersed and counter-current flow, with the, now heated, deep sea water discharging at 19 to 8.

I claim:

1. The process of preparing sea water for a mariculture operation comprising:
   a. supplying heat to a liquid so as to raise its temperature, said heat being derived from solar radiation;
   b. flash evaporating said heated liquid in a closed vessel to convert a portion thereof into vapor at a lower temperature and pressure, whereby some of the sensible heat of said liquid is transformed into the latent heat of said vapor;
   c. supplying an influent of cold deep sea water substantially free of pollution and of marine life inimical to product fish, but with substantial amounts of nutrients for biologic growth;
   d. preheating the deep sea water to raise its temperature to between 55° and 100°F by heat exchange with a major part of said vapor, which is thus condensed; and
   e. conveying the preheated deep sea water to said mariculture operation, which produces at least one species of food fish.

2. The process according to claim 1 wherein:
   a. said liquid which has been heated by means of solar radiation is at least in part said deep sea water after being discharged from said mariculture; and b. said heat of said vapors which is transferred to said influent of said cold deep sea water is the heat of the steam formed by the conversion of some part of the sensible heat of said deep sea water which has been added to the deep sea water by means of said solar radiation.

3. The process according to claim 1 wherein said sensible heat of said liquid is supplied at least in part by heating in a solar heater.

4. The process according to claim 1 wherein said flash evaporation of a part of said liquid is done by a controlled flash evaporation, wherein the temperature of the vapor which is formed is maintained at all times very close to, but below, the temperature of said liquid.

5. The process according to claim 1 wherein said condensation of said vapors is by direct contact with said cold deep sea water in open, dispersed flow; and the condensate of said vapors therefore joins the flow of the warmed deep sea water.

6. The process according to claim 1 wherein:
   a. said liquid which has been heated by means of solar radiation is, at least in part, water from the surface of the sea;
   b. said heat of said vapors is the heat of the steam formed by the evaporation of some part of said surface water, which is thus cooled thereby.

7. The process according to claim 6 wherein at least a part of said steam is expanded to do useful work in driving a steam engine.

8. The process according to claim 6 wherein at least a part of said steam is condensed to give a condensate of fresh water thus heating said cold deep sea water.

9. The process according to claim 1 wherein said vapor is condensed by indirect heat exchange to form a condensate which is withdrawn as such.

10. The process according to claim 9 wherein said liquid with said sensible heat is deaerated by an ingestor before a part of said sensible heat is converted to the heat of said vapors.

11. The process according to claim 9 wherein any non-condensible gases present in said vapors are removed by an ingestor after said condensation.

12. The process according to claim 9 wherein said vapors produced in said flash evaporation are expanded to do useful work in driving a steam engine before being condensed to warm said cold deep sea water.

13. The process according to claim 9 wherein said flash evaporation is conducted in more than one stage; and said vapors formed in the respective stages are used to heat in indirect counter-current heat transfer relation said influent of cold deep sea water.

14. The process according to claim 13 wherein said flash evaporations in more than one stage are done by a controlled flash evaporation wherein the temperature of the vapors formed is maintained at all times very close to but slightly below the temperature of the liquid being flash evaporated.

15. The process according to claim 1 wherein said liquid, of which some part is flash evaporated, is sea water.

16. The process according to claim 15 wherein said vapors produced in said flash evaporation are expanded to do useful work in driving a steam engine before being condensed to warm said cold deep sea water.

17. The process according to claim 15 wherein:
   a. said flash evaporation is conducted in more than one stage;
   b. said vapors formed in the respective stages are used to heat in a countercurrent relation and by direct contact with a circulating stream of condensate formed of said vapors in open flow; and
   c. the heat added to said circulating stream of condensate is then transferred to warm said cold deep sea water.

18. The process according to claim 17 wherein the transfer of said heat added to said stream of condensate is accomplished by contacting directly said heated stream of condensate in open, dispersed, and counter-current flow relation to a stream of colder water - insoluble, liquid; then transferring the heat gained in said water-insoluble liquid by contacting it directly with a stream of cold, deep sea water in open, dispersed, and counter-current flow relation.

19. The process according to claim 1 wherein said liquid to which has been added heat derived from solar radiation is a second thermodynamic liquid having a normal boiling point between about −43°F and 145°F.

20. The process according to claim 19 wherein said vapors of said second thermodynamic liquid are expanded to a lower pressure while doing useful work in driving a heat engine and are then condensed at said lower pressure to give up heat to warm said influent of deep sea water.

21. The process according to claim 20 wherein said heat derived from solar radiation is used to heat at least some part of the condensate of said vapors of said second thermodynamics liquid.

22. The process according to claim 20 wherein:
   a. said second liquid is substantially insoluble in water;
   b. water from at least one level of the sea which has been heated by solar radiation is passed into a closed vessel, to which is also passed the condensate of said vapors of said second liquid in direct contact with said water from the sea;
   c. the pressure in said closed vessel at the temperature resulting from the addition of said sea water and said second liquid in substantially equal to the sum of the vapor, pressures of said sea water and said second liquid at said temperature of their direct contact;
   d. a flash evaporation takes place in said closed vessel with the formation of a mixture of vapors comprising principally those of said second liquid, but also containing some water vapor; and
   e. said mixture of vapors is expanded to a lower pressure in driving a heat engine and is then condensed at said lower pressure to give up heat to warm said influent of deep sea water.

23. The process according to claim 20 wherein said vapors of said second thermodynamic liquid are condensed by indirect heat exchange; and at least some part of the condensate of said vapors of said second liquid is warmed by heat interchange with warm surface sea water.

24. The process according to claim 23 wherein said heat interchange is accomplished by contacting directly said condensate in open, dispersed, and counter-current flow to warm surface water.

* * * * *